(12) United States Patent
Koob et al.

(10) Patent No.: US 10,114,756 B2
(45) Date of Patent: Oct. 30, 2018

(54) EXTERNALLY PROGRAMMABLE MEMORY MANAGEMENT UNIT

(71) Applicant: QUALCOMM Incorporated, San Diego, CA (US)

(72) Inventors: Christopher Edward Koob, Round Rock, TX (US); Erich James Plondke, Austin, TX (US); Piyush Patel, Cary, NC (US); Thomas Andrew Sartorius, Raleigh, NC (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/828,718

(22) Filed: Mar. 14, 2013

(65) Prior Publication Data

US 2014/0281332 A1 Sep. 18, 2014

(51) Int. Cl.
*G06F 12/10* (2016.01)
*G06F 12/1009* (2016.01)
*G06F 12/109* (2016.01)

(52) U.S. Cl.
CPC .......... *G06F 12/10* (2013.01); *G06F 12/1009* (2013.01); *G06F 12/109* (2013.01); *G06F 2212/1008* (2013.01); *G06F 2212/1048* (2013.01); *G06F 2212/1052* (2013.01); *G06F 2212/657* (2013.01)

(58) Field of Classification Search
CPC ......... G06F 2212/303; G06F 2212/306; G06F 2212/50; G06F 3/06; G06F 3/0601; G06F 3/0604; G06F 9/45558; G06F 12/0292; G06F 12/06; G06F 12/10; G06F 12/14; G06F 12/1416; G06F 12/1458; G06F 12/145; G06F 12/0284; G06F 2212/302; G06F 2212/656; F06F 2009/45583
USPC .......... 711/6, 170, 200, 202, 206, 214, 221; 712/203, 34–35, 108
See application file for complete search history.

(56) References Cited

U.S. PATENT DOCUMENTS

| 6,286,092 | B1 | 9/2001 | Frank et al. |
| 6,516,373 | B1 | 2/2003 | Talbot et al. |
| 6,684,305 | B1 * | 1/2004 | Deneau ............... G06F 12/1072 711/133 |

(Continued)

FOREIGN PATENT DOCUMENTS

| CN | 1524228 A | 8/2004 |
| EP | 2498183 A2 | 9/2012 |

(Continued)

OTHER PUBLICATIONS

International Search Report and Written Opinion for International Application No. PCT/US2014/023552, ISA/EPO, dated Jul. 23, 2014, 9 pages.

(Continued)

*Primary Examiner* — Tracy A Warren
(74) *Attorney, Agent, or Firm* — Qualcomm Incorporated-Toler

(57) ABSTRACT

A method includes reading, by a processor, one or more configuration values from a storage device or a memory management unit. The method also includes loading the one or more configuration values into one or more registers of the processor. The one or more registers are useable by the processor to perform address translation.

35 Claims, 4 Drawing Sheets

(56) References Cited

U.S. PATENT DOCUMENTS

| | | |
|---|---|---|
| 6,732,250 B2 | 5/2004 | Durrant |
| 6,981,072 B2 | 12/2005 | Day et al. |
| 7,134,007 B2 | 11/2006 | Zimmer et al. |
| 7,299,337 B2 | 11/2007 | Traut et al. |
| 7,620,678 B1 | 11/2009 | Master et al. |
| 7,685,409 B2 | 3/2010 | Du et al. |
| 7,739,476 B2 | 6/2010 | Pan et al. |
| 7,962,909 B1 | 6/2011 | Klaiber |
| 8,250,254 B2 | 8/2012 | Saripalli |
| 8,312,230 B2 | 11/2012 | Jacobs et al. |
| 8,700,883 B1 * | 4/2014 | Glasco ............... G06F 12/1027 711/202 |
| 2002/0138679 A1 | 9/2002 | Koning et al. |
| 2004/0139442 A1 | 7/2004 | Miyamoto |
| 2004/0186981 A1 * | 9/2004 | Christie ............. G06F 9/30036 712/210 |
| 2005/0251806 A1 | 11/2005 | Auslander et al. |
| 2006/0005188 A1 | 1/2006 | Vega et al. |
| 2007/0169127 A1 | 7/2007 | Kashyap |
| 2007/0283336 A1 | 12/2007 | Gschwind et al. |
| 2008/0183931 A1 * | 7/2008 | Verm ..................... G06F 12/10 710/260 |
| 2008/0244599 A1 | 10/2008 | Hodson et al. |
| 2009/0217276 A1 | 8/2009 | Brenner et al. |
| 2009/0282198 A1 | 11/2009 | Hamoudi et al. |
| 2010/0107249 A1 * | 4/2010 | Krig ....................... G06F 21/57 726/22 |
| 2010/0125708 A1 | 5/2010 | Hall et al. |
| 2010/0153945 A1 | 6/2010 | Bansal et al. |
| 2010/0242014 A1 | 9/2010 | Zhu |
| 2010/0325454 A1 | 12/2010 | Parthasarathy |
| 2011/0072428 A1 | 3/2011 | Day, II et al. |
| 2011/0296406 A1 | 12/2011 | Bhandari et al. |
| 2012/0072638 A1 | 3/2012 | Grubb et al. |
| 2012/0240112 A1 | 9/2012 | Nishiguchi et al. |
| 2012/0272015 A1 | 10/2012 | Fahrig |
| 2012/0291033 A1 | 11/2012 | De et al. |
| 2013/0013889 A1 * | 1/2013 | Devaraj ............. G06F 12/1483 711/207 |
| 2013/0036323 A1 * | 2/2013 | Goose ................. G06F 11/1484 714/4.11 |
| 2013/0055252 A1 | 2/2013 | Lagar-Cavilla et al. |
| 2014/0053272 A1 | 2/2014 | Lukacs et al. |
| 2014/0244983 A1 * | 8/2014 | McDonald et al. .......... 712/225 |
| 2014/0282507 A1 | 9/2014 | Plondke et al. |
| 2014/0282508 A1 * | 9/2014 | Plondke et al. .................. 718/1 |

FOREIGN PATENT DOCUMENTS

| | | |
|---|---|---|
| JP | 2005500592 A | 1/2005 |
| WO | 0137088 A2 | 5/2001 |
| WO | 2005029326 A1 | 3/2005 |
| WO | 2008054619 A2 | 5/2008 |
| WO | 2012005949 A2 | 1/2012 |

OTHER PUBLICATIONS

Tadokoro et al. "A Secure System-wide Process Scheduler across Virtual Machines," 2010 IEEE 16th Pacific Rim International Symposium on Dependable Computing (PRDC), DOI: 10.1109/PRDC.2010.34, Publication Year: 2010 , pp. 27-36.

* cited by examiner

EXTERNALLY PROGRAMMABLE MEMORY MANAGEMENT UNIT

I. CROSS-REFERENCE TO RELATED APPLICATIONS

The present application is related to co-pending Attorney Docket Number 124502, entitled "SYSTEMS AND METHODS OF EXECUTING MULTIPLE HYPERVISORS" and filed Mar. 14, 2013, the content of which is incorporated by reference in its entirety.

II. FIELD

The present disclosure is generally related to memory management units (MMUs).

III. BACKGROUND

Advances in technology have resulted in smaller and more powerful computing devices. For example, there currently exist a variety of portable personal computing devices, including wireless computing devices, such as portable wireless telephones, personal digital assistants (PDAs), tablet computers, and paging devices that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

Electronic devices, such as mobile phones, may include multiple processors. For example, a mobile phone may include a central processing unit (CPU) (sometimes referred to as an application processor) and a digital signal processor (DSP). Each processor may be better suited than the other processor(s) to perform certain computation tasks. For example, the CPU, which may act as the primary processor and may execute the mobile phone operating system, may be more efficient in executing "control code," such as web browser and user interface code. On the other hand, the DSP may be more efficient than the CPU when executing signal processing and other math-intensive functions.

in some multi-processor devices, one of the processors may act as a "primary" processor and the remaining processors may act as "secondary" processors. The primary processor may set guidelines regarding what the secondary processors can and cannot do. In addition, the primary processor may force the secondary processors to rely on the primary processor for certain configuration information, instead of computing such configuration information at the secondary processors. The primary processor may restrict the secondary processors from calculating such configuration information for security purposes (e.g., to avoid a situation in which multiple secondary processors attempt to define the same configuration information, which may result in loss of data integrity, deadlock, etc.).

IV. SUMMARY

A memory management unit (MMU) and an executable instruction for use with the MMU are disclosed. Advantageously, the MMU may be included within or coupled to a secondary processor and may present an externally programmable interface that is compatible with a primary processor, so that the primary processor can program configuration values for use in the MMU for the secondary processor. The MMU may also provide an internal interface that does not require external programming by the primary processor, so that the secondary processor may perform operations that are unrestricted by the primary processor without having to rely on the primary processor.

In a particular embodiment, an apparatus includes an interface to a first processor. The apparatus also includes a second processor including a memory management unit. The apparatus further includes a memory device storing one or more configuration values. The first processor is configured to use the interface to program the one or more configuration values into the memory device. The second processor is configured to use the one or more configuration values to perform address translation. For example, the interface may match an interface of a system MMU (SMMU) (e.g., may be "SMMU-compatible"), and the interface may be used by the first processor to program the location of address translation tables for use by the second processor.

In another particular embodiment, a non-transitory computer-readable medium stores an instruction that is executable by a processor to perform operations that include reading one or more configuration values from a storage device of a memory management unit. The operations also include loading the one or more configuration values into one or more registers of a processor. The one or more registers are usable to perform address translation by the processor.

In another particular embodiment, a non-transitory computer-readable medium stores an instruction that is executable by a processor to perform operations that include reading one or more configuration values from a memory and loading the one or more configuration values into one or more registers of a processor. The one or more registers are exclusively writable by the instruction. The one or more configuration values are useable by the processor to perform address translation.

In another particular embodiment, a method includes reading, by a processor, one or more configuration values from a storage device associated with a memory management unit of the processor. The method also includes loading the one or more configuration values into one or more registers of the processor. The one or more registers are useable by the processor to perform address translation.

In another particular embodiment, an apparatus includes first means for processing and means for interfacing to the first means for processing. The apparatus also includes second means for processing. The second means for processing includes a memory management unit. The apparatus further includes means for storing one or more configuration values. The first means for processing is configured to use the means for interfacing to program the one or more configuration values into the means for storing. The second means for processing is configured to use the one or more configuration values to perform address translation.

One particular advantage provided by at least one of the disclosed embodiments is an externally programmable MMU that can be used by a primary processor to program address translations for a secondary processor. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
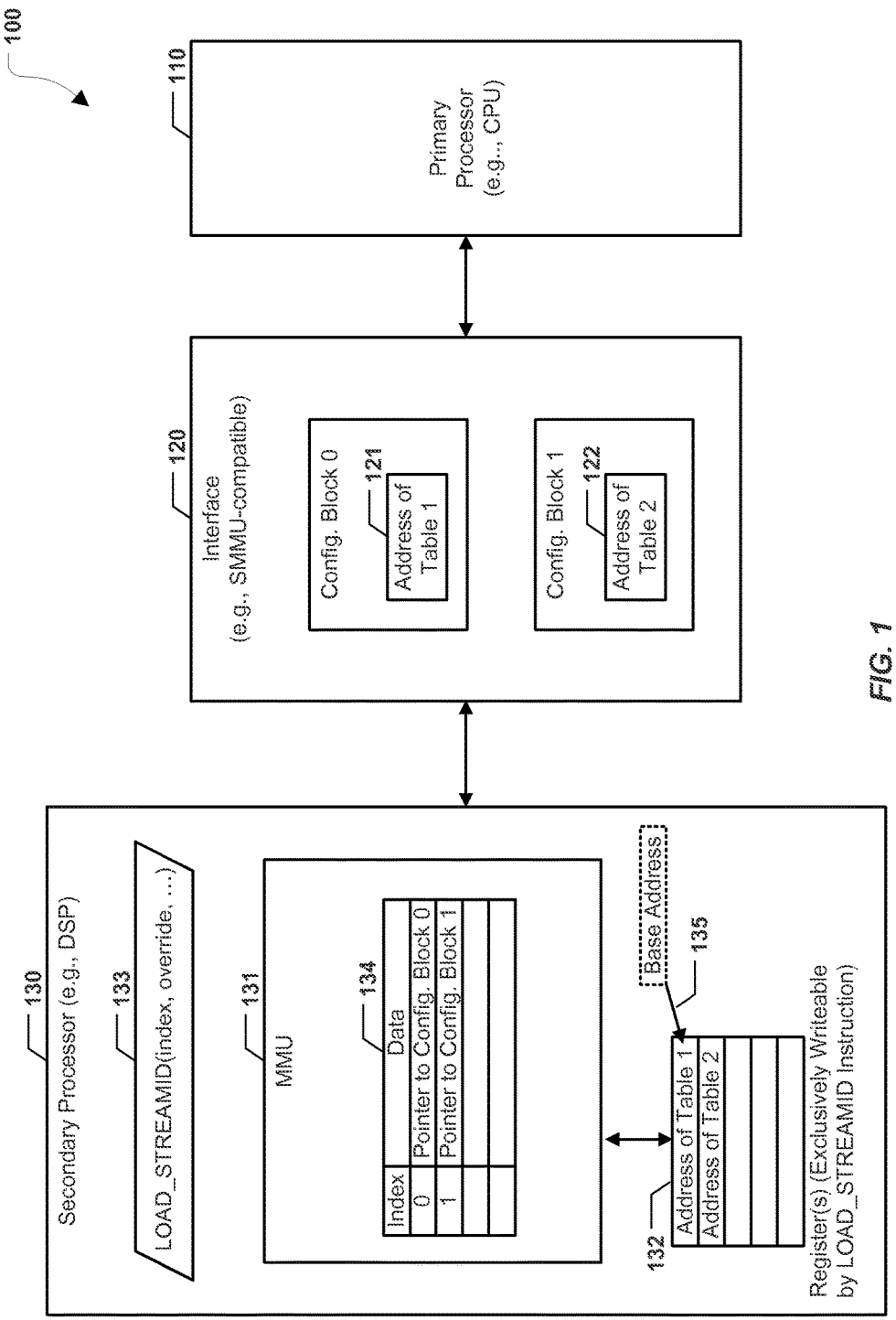
FIG. 1 is a block diagram to illustrate a particular embodiment of a system that includes an externally programmable memory management unit (MMU)

FIG. 1 is a block diagram to illustrate a particular embodiment of a system 100 that includes an externally programmable memory management unit (MMU). In the system 100, a "primary" processor (e.g., a central processing unit (CPU)) 110 may program configuration values for a "secondary" processor (e.g., a digital signal processor (DSP)) 130 via an interface 120. The interface 120 may match an interface of a system memory management unit (SMMU) (also referred to as an input/output MMU (IOMMU)). The SMMU-compatible interface 120 may be compatible with the primary processor 110 for external programming by the primary processor 110. For example, an SMMU interface may be a standardized memory management interface. The SMMU-compatible interface 120 may be accessed by the primary processor 110 to program configuration values (e.g., one or more addresses of one or more address translation tables), as further described herein. The processor 110 may be considered a "primary" processor and the processor 130 may be considered a "secondary" processor because the processor 130 relies on the processor 110 to program certain configuration values, instead of the processor 130 self-programming the configuration values.

The primary processor 110 and the secondary processor 130 may be associated with different instruction set architectures. For example, the primary processor 110 may be associated with a CPU-specific instruction set architecture and the secondary processor 130 may be associated with a DSP-specific instruction set architecture. Each processor 110, 130 may include one or more processing units, cores, and/or hardware threads, as further described herein. A multithreaded processor can be implemented via a processor with multiple hardware execution contexts executing concurrently, or as multiple processors with a single hardware execution context (e.g., a symmetric multiprocessing (SMP) cluster). It should be noted that the description of CPUs and DSPs herein is for example only. Other processors or sets of processors, such as network processing units (NPUs), graphical processing units (GPUs), etc., may also be included in the system 100.

Three types of memory addresses may be used in the system 100: virtual addresses (VAs), intermediate physical addresses (IPAs) (also referred to as pseudophysical addresses), and physical addresses (PAs). Each virtual address may be associated with a virtual address space, and each intermediate physical address may be associated with an intermediate physical address space. Physical addresses, which can be used to directly access regions of memory (e.g., random access memory (RAM), disk-based memory, cache memory, register memory, etc.) and memory-mapped devices (e.g., input/output (I/O) devices) may belong to a single physical address space. When virtual addresses, intermediate physical addresses, and physical addresses are used in the system 100, two types of address translation mappings may be defined in the system 100. A first type of address translation mapping may be from virtual address to intermediate physical address, and a second type of address translation mapping may be from intermediate physical address to physical address. Thus, a "complete" address translation mapping for a virtual address in the system 100 may include a "first stage" translation from the virtual address to an intermediate physical address, followed by a "second stage" translation from the intermediate physical address to a physical address.

The primary processor 110 may use the interface 120 to program information that the secondary processor 130 can use to perform address translation. For example, the interface 120 may store addresses of address translation tables. The address translation tables may be stored in memory (e.g., random access memory (RAM)) and may define VA-to-IPA translations and/or IPA-to-PA translations. In the example of FIG. 1, the primary processor 110 programs a first address 121 of a first address translation table and a second address 122 of a second address translation table. It should be noted that although two addresses 121, 122 (e.g., base addresses) are shown in FIG. 1, more or fewer than two addresses may be programmed via the interface 120.

The secondary processor 130 may include a memory management unit (MMU) 131 and one or more registers 132 (e.g., as part of a register file). The secondary processor 130 may support execution of an instruction 133 to selectively retrieve and load configuration values from the interface 120 into the registers 132. In FIG. 1, the instruction 133 is designated as a "LOAD_STREAMID" instruction. The LOAD_STREAMID instruction 133 may include one or more operands. For example, the LOAD_STREAMID instruction 133 may include an index operand. When executed, the LOAD_STREAMID instruction 133 may access a table 134 stored in a storage device of the MMU 131 using the index operand to access a pointer to a configuration block. For example, FIG. 1 illustrates that the table 134 stores a pointer to configuration block 0 (which includes the first address 121 of the first address translation table) at index 0 and a pointer to configuration block 1 (which includes the second address 122 of the second address translation table) at index 1. The configuration blocks may also include other process and guest environment parameters. The pointer to the configuration block may be externally programmed by the primary processor 110 and/or may be determined by the secondary processor 130.

The one or more registers 132 may be used to store configuration values that are programmed by the primary processor 110 and retrieved by the secondary processor 130. For example, as shown in FIG. 1, the first address 121 and the second address 122 may be retrieved from the interface 120 and stored in the registers 132. The values loaded into the registers 132 may be used by the secondary processor 130 to perform address translation. For example, the values loaded into the registers 132 may be used by the secondary processor 130 to access address translation tables that store conversions from a virtual address to a physical address (e.g., during a load, store, or fetch operation). It should be noted that although one set of registers 132 is shown, this is for example only. In a particular embodiment, the secondary processor 130 is a multithreaded processor or part of a multi-processor device, and a different set of registers 132 is used for each hardware thread or hardware processor.

The interface 120 may be an externally programmable extension or counterpart to the MMU 131 of the secondary processor 130. It should be noted that although the interface 120 is illustrated in FIG. 1 as being external to the secondary processor 130, this is for example only. In alternate embodiments, all or a portion of the interface 120 may be integrated within the secondary processor 130.

During operation, the primary processor 110 may program the addresses 121, 122 into the interface 120. The secondary processor 130 may load the addresses 121, 122 into the registers 132 using the instruction 133, so that, for example, a page table walker of the secondary processor 130 can use the registers 132 to perform address translation. In a particular embodiment, for security purposes, the registers 132 are exclusively writeable by the instruction 133. That is, although other instructions may be able to write other registers of the secondary processor 130, only the instruction 133 is permitted to write to the registers 132. For example, whether or not the registers 132 are writeable may depend on a value of a signal received by the secondary processor 130 from the primary processor 110 (e.g., via an inter-processor connection). In another particular embodiment, the secondary processor 130 may be permitted to selectively write to the registers 132 in certain situations (e.g., to perform debugging at the secondary processor 130 without involving the primary processor 110 and without having to execute software instructions).

The secondary processor 130 may use the externally programmed configuration values loaded into the registers 132 to perform address translation. For example, the secondary processor 130 may use the configuration values (e.g., base addresses) stored in the registers 132 to perform VA-to-IPA translation and/or IPA-to-PA translation.

It should be noted that although the primary processor 110 and the secondary processor 130 are illustrated as separate processors, this is for example only. In an alternate embodiment, the primary processor 110 and the secondary processor 130 may be the same processor (i.e., the described techniques may enable self-programming of a MMU by a processor).

In a particular embodiment, the system 100 of FIG. 1 may be integrated into a hypervisor-controlled computing environment. For example, the primary processor 110 may be associated with a "primary" hypervisor and the secondary processor 130 may be associated with a "secondary" hypervisor. In this case, each of the processors 110, 130 may schedule virtual processors corresponding to tasks of guest operating systems executing on the processors 110, 130. In a particular embodiment, at least one guest operating system executing on the processor 110 or the processor 130 is a real-time operating system (RTOS). In a particular embodiment, when the system 100 is integrated into a hypervisor-controlled computing environment, first stage translations may be programmed by individual guest operating systems and second stage translations may be performed by the primary hypervisor for all guest operating systems.

During execution of a virtual processor on the secondary processor 130, when a page miss occurs, the MMU 131 may access the configuration values in the registers 132 to perform address translation. When a context switch between virtual processors occurs, the LOAD_STREAMID instruction 133 may be executed by the secondary processor 130 to load address translation information for the new virtual processor into the registers 132.

In a particular embodiment, the LOAD_STREAMID instruction 133 includes an index operand associated with the new virtual processor. If the configuration values for the new virtual processor were previously loaded into the registers 132, execution of the LOAD_STREAMID instruction 133 may complete without reloading the configuration values into the registers 132, thereby saving time and computational resources. For example, the MMU 131 may determine that the values were previously loaded into the registers 132 based on the index operand of the LOAD_STREAMID instruction 133. Alternately, or in addition, it may be determined that the values were previously loaded into the registers 132 based on data that is stored in the table 134 (e.g., the configuration blocks of the interface 120).

In a particular embodiment, the LOAD_STREAMID instruction 133 supports an optional override operand. When the override operand is included, execution of the LOAD_STREAMID instruction 133 may result in overriding a value loaded into the registers 132. For example, guest operating system(s) that run exclusively on the secondary processor 130 may create multiple processes without multiple interface blocks. In such situations, the override operand may be used to override a base address (e.g., in a base address register) with a different base address for VA-to-IPA translation, as shown at 135.

The system 100 of FIG. 1 may thus provide a memory management architecture that is compatible with the primary processor 110 for external programming and that provides an internal interface (e.g., via the registers 132) for use in performing address translation and debugging by the secondary processor 130. For example, although the interface 120 is not actually a SMMU, the interface 120 presents a SMMU-compatible interface to the primary processor 110, so that the primary processor 110 can communicate with the interface 120 as if the primary processor 110 were communicating with an actual SMMU. The primary processor 110 may determine second stage translations, store the second stage translations in address translation tables, and store addresses of the address translation tables in the interface 120. The secondary processor 130 may refresh the internal registers 132 using values from the interface 120 during context switches. Thus, from the perspective of the primary processor 110, the system 100 may provide an externally programmable MMU that can store values relied upon by another device. From the perspective of the secondary processor 130, the system 100 may provide an instruction that can be executed to fill translation register values from an externally programmed storage device.

Figure 2:
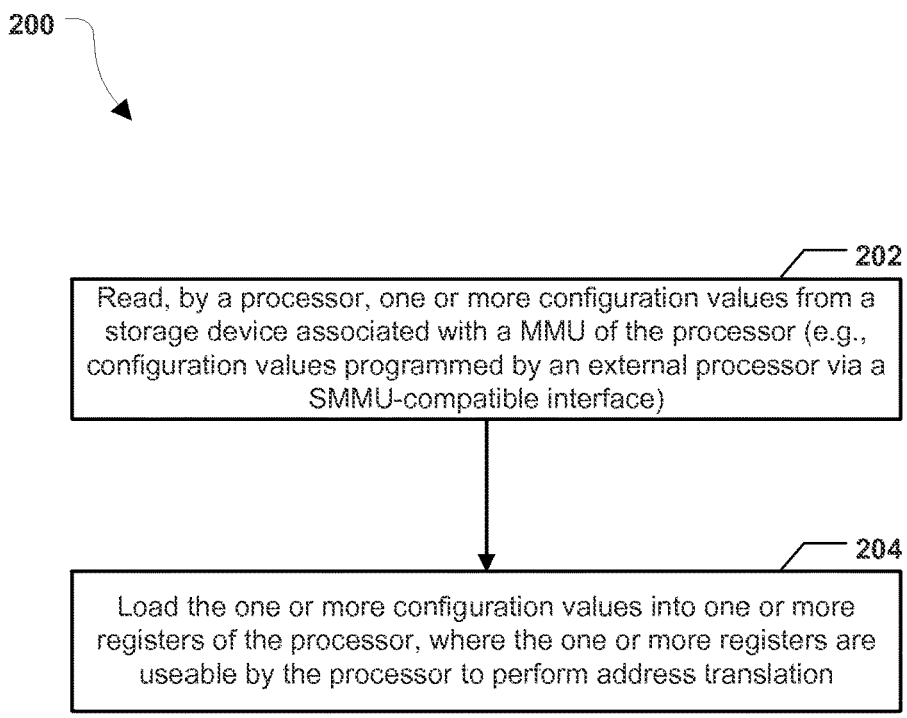
FIG. 2 is a flowchart to illustrate a particular embodiment of a method of accessing an externally programmable MMU.

FIG. 2 is a flowchart to illustrate a particular embodiment of a method 200 of accessing an externally programmable MMU. In an illustrative embodiment, the method 200 may be performed at the system 100 of FIG. 1.

The method 200 may include reading, by a processor, one or more configuration values from a storage device associated with a MMU of the processor, at 202. For example, the storage device may store configuration values programmed by an external processor via a SMMU-compatible interface, where the values are to be used by the MMU of the processor (e.g., during address translation). In a particular embodiment, the storage device is external to the MMU. For example, referring to FIG. 1, the secondary processor 130 may read configuration values, such as the addresses 121 and/or 122, where the configuration values are programmed by the primary processor 110 via the interface 120.

The method 200 may also include loading the one or more configuration values into one or more registers of the processor, at 204. The one or more registers are useable by the processor to perform address translation. For example, referring to FIG. 1, the configuration values (e.g., the addresses 121 and/or 122) may be loaded into the registers 132 and used for address translation (e.g., VA-to-IPA translation and/or IPA-to-PA translation).

The method 200 of FIG. 2 may thus enable use of an externally programmable MMU to communicate configuration values that are programmed by one processor (e.g., a primary processor) and usable by another processor (e.g., a secondary processor).

The method 200 of FIG. 2 may be executed by a digital signal processor (DSP), a processing unit such as a central processing unit (CPU), a controller, a field-programmable gate array (FPGA) device, an application-specific integrated circuit (ASIC), another hardware device, a firmware device, or any combination thereof. As an example, the method 200 of FIG. 2 can be performed by a processor that executes instructions, as described with respect to FIG. 4.

Figure 3:
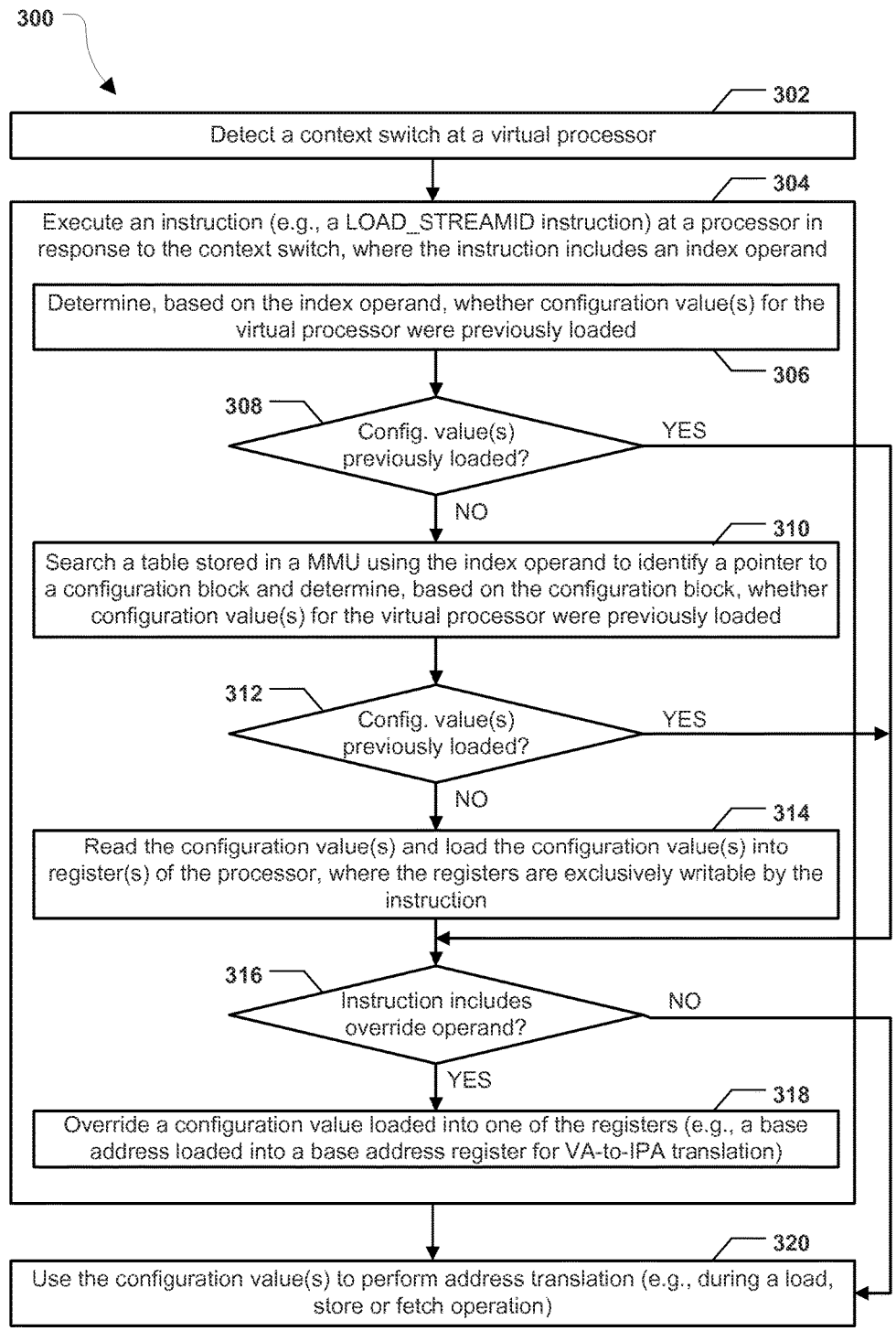
FIG. 3 is a flowchart to illustrate a particular embodiment of a method of executing an instruction to selectively use an externally programmable MMU.

FIG. 3 is a flowchart to illustrate a particular embodiment of a method 300 of executing an instruction to selectively use an externally programmable MMU. In an illustrative embodiment, the method 300 may be performed by the secondary processor 130 of FIG. 1.

The method 300 may include detecting a context switch to a virtual processor, at 302. For example, in FIG. 1, a context switch to a particular virtual processor may be detected at the secondary processor 130. The method 300 may also include executing an instruction at a processor in response to the context switch, where the instruction includes an index operand, at 304. For example, in FIG. 1, the secondary processor 130 may execute the LOAD_STREAMID instruction 133. Executing the instruction may include determining, based on the index operand, whether configuration value(s) for the virtual processor were previously loaded (and are therefore already available), at 306. For example, configuration value(s) for the virtual processor may include data that is useable to perform VA-to-IPA translation, IPA-to-PA translation, and/or other process/environmental data.

When it is determined, at 308, that the configuration value(s) were previously loaded, the method 300 may advance to 316. When it is determined, at 308, that the configuration value(s) were not previously loaded, the method 300 may include searching a table stored in a MMU using the index operand to identify a pointer to a configuration block. Based on the configuration block it may be determined whether configuration value(s) for the virtual processor were previously loaded, at 310. When it is determined, at 312, that the configuration value(s) were previously loaded, the method 300 may advance to 316.

When it is determined, at 312, that the configuration value(s) were not previously loaded, the method 300 may include reading the configuration value(s) (e.g., from the configuration blocks) and loading the configuration value(s) into register(s) of the processor, at 314. For example, in FIG. 1, the addresses 121, 122 may be loaded into the registers 132. The registers 132 may be exclusively writable by the instruction, for security purposes. For example, whether or not the registers 132 are writable may depend on a value of a write enable signal received from another processor (e.g., a primary processor).

Advancing to 316, the method 300 may include determining whether the instruction includes an override operand. When the instruction includes the override operand, the method 300 may include overriding a configuration value loaded into one of the registers, at 318. For example, a base address loaded into a base address register for VA-to-IPA translation may be overridden. Continuing to 320, the method 300 may include using the configuration value(s) to perform address translation (e.g., translating from a virtual address provided by a task of a guest operating system to an intermediate physical address and/or translating from an intermediate physical address to a physical address that corresponds to a particular region of memory or a particular memory-mapped device). For example, address translation may be performed when a store operation, a load operation, or a fetch operation is executed at the secondary processor 130 of FIG. 1.

The method 300 of FIG. 3 may thus be used to execute an instruction that selectively loads externally programmed configuration values into internal registers when the configuration values are not available in the registers. However, if the configuration values are available in the registers (e.g., the configuration values were previously loaded into the registers), execution of the instruction may terminate without performing an external read operation to access the configuration values, which may save processing time and computational resources.

The method 300 of FIG. 3 may be executed by a digital signal processor (DSP), a processing unit such as a central processing unit (CPU), a controller, a field-programmable gate array (FPGA) device, an application-specific integrated circuit (ASIC), another hardware device, a firmware device, or any combination thereof. As an example, the method 300 of FIG. 3 can be performed by a processor that executes instructions, as described with respect to FIG. 4.

Figure 4:
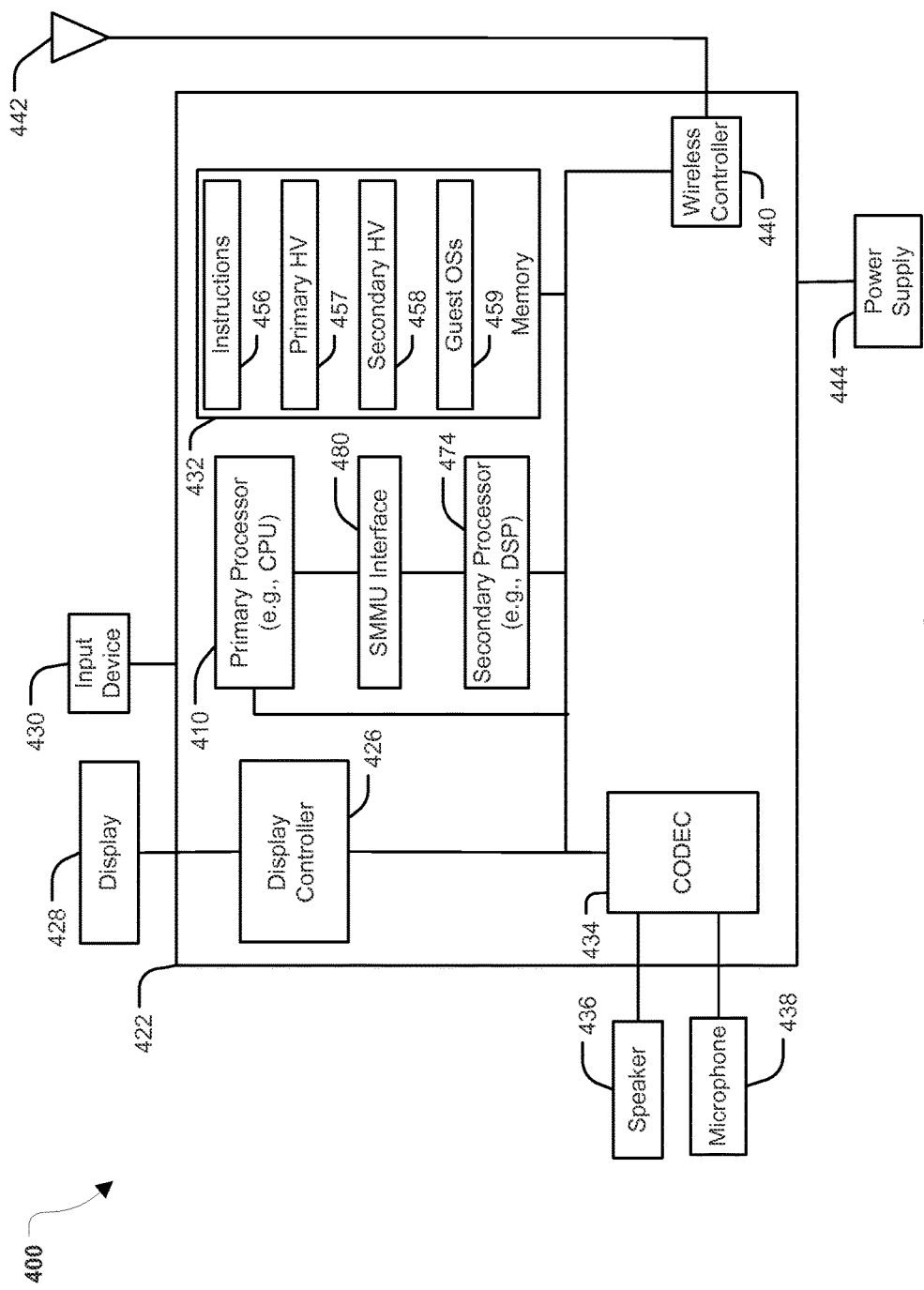
FIG. 4 is a block diagram of a wireless device including an externally programmable MMU.

Referring to FIG. 4, a block diagram of an electronic device 400 is shown. The electronic device 400 includes a primary processor 410, such as a central processing unit (CPU) and a secondary processor 474, such as a digital signal processor (DSP), each of which is coupled to a memory 432. The primary processor 410 and the secondary processor 474 may have different instruction set architectures. In an illustrative embodiment, the primary processor 110 is the primary processor 110 of FIG. 1 and the secondary processor 474 is the secondary processor 130 of FIG. 1. The electronic device 400, or components thereof, may be included in a communications device, a personal digital assistant (PDA), a mobile phone, a set top box, a music player, a video player, an entertainment unit, a navigation device, a fixed location data unit, a computing device, or any combination thereof.

A SMMU Interface 480 may be disposed between the primary processor 410 and the secondary processor 474. In an illustrative embodiment, the SMMU Interface 480 may be the interface 120 of FIG. 1. The primary processor 410 may program configuration values, such as addresses of address translation tables stored in memory, to data storage locations in the SMMU interface 480. The secondary processor 474 may retrieve the configuration values from the SMMU Interface 480 when a context switch occurs, may store the retrieved configuration values in internal registers, and may use the stored configuration values to perform address translation.

FIG. 4 also shows a display controller 426 that is coupled to the processors 410, 474 and to a display 428. A coder/decoder (CODEC) 434 can also be coupled to the processors 410, 474. A speaker 436 and a microphone 438 can be coupled to the CODEC 434. FIG. 4 also indicates that a wireless controller 440 can be coupled to the processors 410, 474 and to an antenna 442 (e.g., via a radio frequency (RF) interface).

The memory 432 may be a tangible non-transitory computer-readable or processor-readable storage medium that includes executable instructions 456. The instructions 456 may be executed by processor(s), such as the sets of processors 410, 474, to perform various functions and methods described herein, including the method 200 of FIG. 2 and/or the method 300 of FIG. 3. For example, the instructions 456 may include the LOAD_STREAMID instruction 133 of FIG. 1. The memory may also store instructions and/or data corresponding to a primary hypervisor 457 (e.g., that is executable on the primary processor 410), a secondary hypervisor 458 (e.g., that is executable on the secondary processor 474), and one or more guest operating systems 459.

In a particular embodiment, the processors 410, 474, the display controller 426, the memory 432, the CODEC 434, and the wireless controller 440 are included in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the antenna 442, and the power supply 444 are external to the system-on-chip device 422. However, each of the display 428, the input device 430, the speaker 436, the microphone 438, the antenna 442, and the power supply 444 can be coupled to a component of the system-on-chip device 422, such as an interface or a controller.

In conjunction with the described embodiments, an apparatus includes an interface to first means for processing. For example, the interface may be the interface 120 of FIG. 1, the SMMU Interface 480 of FIG. 4, another interface, or any combination thereof. The first means for processing may be a hardware processor, such as the primary processor 110 of FIG. 1 or the primary processor 410 of FIG. 4, one or more other devices or circuits to process data, or any combination thereof. The apparatus also includes second means for processing. The second means for processing includes a memory management unit. For example, the second means for processing may include a hardware processor, such as the secondary processor 130 of FIG. 1 or the secondary processor 474 of FIG. 4, one or more other devices or circuits to process data, or any combination thereof. The memory management unit may include the MMU 131, one or more other devices or circuits to manage memory, or any combination thereof. The apparatus also includes means for storing one or more configuration values. For example, the means for storing may include a memory of the interface 120 of FIG. 1, a memory of the SMMU interface 480 of FIG. 4, a memory external to a processor and/or a MMU, a memory internal to a processor and/or a MMU, one or more other devices or circuits to store data, or any combination thereof. The first means for processing is configured to use the interface to program the one or more configuration values into the means for storing. The second means for processing may be configured to use the one or more configuration values to perform address translation. In a particular embodiment, the first means for processing is associated with a first instruction set architecture and the second means for processing is associated with a second instruction set architecture that is different from the first instruction set architecture. For example, the first means for processing may be associated with a first instruction set architecture (e.g., a CPU-specific instruction set architecture) and the second means for processing may be associated with a second instruction set architecture (e.g., a DSP-specific instruction set architecture).

Those of skill would further appreciate that the logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a first processor configured to store, at a first memory that is external to and accessible to a second processor, addresses of address translation tables, the addresses stored in configuration blocks of the first memory; and
the second processor configured to:
store, at a memory of the second processor, a table of pointers to the configuration blocks of the first memory;
identify, in the table of pointers, a first pointer to a first configuration block based on an index operand of an instruction;
read, from the first configuration block, an address of a first address translation table based on the first pointer; and
load the address, from the first configuration block of the first memory, into a register of the second processor, wherein the register of the second processor is configured to be exclusively writeable responsive to execution of the instruction based on a value of a write enable signal received from the first processor, wherein the instruction includes an override operand to indicate whether to override contents of the register of the second processor.

2. The apparatus of claim 1, wherein the address translation tables are stored at a random access memory.

3. The apparatus of claim 1, wherein a memory management unit of the second processor includes the memory that stores the table of pointers, and wherein the table of pointers is indexed based on the index operand of the instruction.

4. The apparatus of claim 3, wherein the second processor is configured to execute the instruction in response to detecting a context switch.

5. The apparatus of claim 1, wherein the second processor is configured to perform address translation using the first address translation table, and wherein, to perform the address translation, the second processor is further configured to convert a virtual address to an intermediate physical address, to convert the intermediate physical address to a physical address, or any combination thereof.

6. The apparatus of claim 1, wherein the first memory is compatible with a system memory management unit (SMMU) interface.

7. The apparatus of claim 1, wherein the second processor is configured to perform address translation during a fetch operation executed at the second processor, a read operation executed at the second processor, a store operation executed at the second processor, or any combination thereof.

8. The apparatus of claim 1, wherein the first processor is associated with a first instruction set architecture, and wherein the second processor is associated with a second instruction set architecture that is different from the first instruction set architecture.

9. The apparatus of claim 1, wherein the first processor is associated with a first hypervisor, and wherein the second processor is associated with a second hypervisor.

10. The apparatus of claim 1, wherein the first processor comprises a central processing unit (CPU), and wherein the second processor comprises a digital signal processor (DSP).

11. A non-transitory computer-readable medium storing instructions executable by at least one processor to perform operations comprising:
    storing, by a first processor at a first memory that is external to a second processor, addresses of address translation tables, the addresses stored in configuration blocks of the first memory;
    storing, at a memory of the second processor, a table of pointers to the configuration blocks of the first memory;
    identifying, in the table of pointers, a first pointer to a first configuration block based on an index operand of an instruction;
    reading, from the first configuration block, an address of a first address translation table based on the first pointer;
    loading the address, from the first configuration block of the first memory, into a register of the second processor, wherein the register of the second processor is configured to be exclusively writeable in response to execution of the instruction based on a value of a write enable signal received from the first processor; and
    determining whether to override contents of the register of the second processor with the address of the first address translation table based on an override operand of the instruction.

12. The non-transitory computer-readable medium of claim 11, wherein the second processor is configured to execute the instruction in response to detecting a context switch.

13. The non-transitory computer-readable medium of claim 11, wherein a memory management unit of the second processor includes the memory that stores the table of pointers, and wherein the table of pointers is indexed based on the index operand of the instruction.

14. The non-transitory computer-readable medium of claim 13, wherein the table of pointers includes a second pointer to a second configuration block of the first memory that stores an address of a second address translation table.

15. The non-transitory computer-readable medium of claim 14, wherein the first address translation table includes at least one virtual address to intermediate physical address translation, at least one intermediate physical address to physical address translation, or any combination thereof.

16. The non-transitory computer-readable medium of claim 11, wherein the operations further comprise determining whether to bypass loading the address of the first address translation table into the register of the second processor based on whether the address of the first address translation table is stored at the register of the second processor.

17. The non-transitory computer-readable medium of claim 16, wherein the operations further comprise determining whether the address of the first address translation table is stored at the register of the second processor based on a particular operand of the instruction, based on the table of pointers stored at the memory of the second processor, or any combination thereof.

18. The non-transitory computer-readable medium of claim 11, wherein the second processor is configured to perform address translation during a fetch operation executed at the second processor, a read operation executed at the second processor, a store operation executed at the second processor, or any combination thereof.

19. The non-transitory computer-readable medium of claim 17, wherein the address comprises a base address that is stored at a base address register and that is useable to perform virtual address to intermediate physical address translation.

20. A non-transitory computer-readable medium storing an instruction that is executable by a first processor to perform operations comprising:
    searching a table stored in a first memory of a memory management unit (MMU) of the first processor for an entry based on an index operand of the instruction;
    accessing, from the entry, a pointer that points to a first configuration block of a plurality of configuration blocks in a second memory that is external to the MMU, the first configuration block including an address of an address translation table, the address stored in the second memory by a second processor;
    reading, from the first configuration block, the address of the address translation table based on the pointer;
    loading the address, from the first configuration block, into a register of the first processor, wherein the register of the first processor is configured to be exclusively writeable responsive to execution of the instruction based on a value of a write enable signal received from the second processor; and
    determining, by the first processor, whether to override contents at the register of the first processor with the address of the address translation table based on an operand of the instruction.

21. The non-transitory computer-readable medium of claim 20, wherein the second memory comprises an externally programmable memory.

22. The non-transitory computer-readable medium of claim 20, wherein the plurality of configuration blocks store multiple addresses of multiple address translation tables, and wherein the multiple addresses are stored by the second processor.

23. The non-transitory computer-readable medium of claim 20, wherein the address translation table enables address translation by the first processor, and wherein the address translation includes virtual address to intermediate physical address translations, intermediate physical address to physical address translations, or any combination thereof.

24. The non-transitory computer-readable medium of claim 20, wherein a second entry of the table is associated with a second index and includes a second pointer that points to a second configuration block of the plurality of configuration blocks, the second configuration block including an address of a second address translation table.

25. The non-transitory computer-readable medium of claim 20, wherein the address translation table includes virtual address to intermediate physical address translations, intermediate physical address to physical address translations, or any combination thereof.

26. A method comprising:
storing, by a first processor at a first memory that is external to a second processor, addresses of address translation tables, the addresses stored in configuration blocks;
storing, at a memory of the second processor, a table of pointers to the configuration blocks of the first memory;
identifying, in the table of pointers, a first pointer to a first configuration block based on an index operand of an instruction;
reading, from the first configuration block, an address of a first address translation table based on the first pointer;
loading the address, from the first configuration block of the first memory, into a register of the second processor, wherein the register of the second processor is configured to be exclusively writeable in response to execution of the instruction based on a value of a write enable signal received from the first processor; and
determining whether to override contents of the register of the second processor based on an override operand of the instruction.

27. The method of claim 26, wherein the address of the first address translation table is loaded into the register of the second processor during execution by the second processor of the instruction.

28. The method of claim 26, wherein the instruction is executed by the second processor in response to detecting a context switch.

29. The method of claim 26, wherein the memory is in a memory management unit of the second processor and, in response to searching the table of pointers based on the index operand of the instruction, the address of the first address translation table is loaded by the second processor into the register of the second processor.

30. The method of claim 26, wherein overriding the contents of the register of the second processor comprises overwriting at least one value.

31. The method of claim 26, wherein the first address translation table includes virtual address to intermediate physical address translations, intermediate physical address to physical address translations, or any combination thereof.

32. The method of claim 26, further comprising bypassing loading of a second address of a second address translation table to the register of the second processor in response to determining that the second address is stored at the register of the second processor.

33. An apparatus comprising:
first means for processing, the first means for processing configured to store, at first means for storing, addresses of an address translation tables, the addresses stored in configuration blocks; and
second means for processing, the second means for processing configured to:
store, at the second means for processing, a table of pointers to the configuration blocks of the first means for storing;
identify, in the table of pointers, a first pointer to a first configuration block of the first means for storing based on an index operand of an instruction;
read, from the first configuration block of the first means for storing, an address of a first address translation table based on the first pointer; and
load the address, from the first configuration block of the first means for storing, into a register of the second means for processing, wherein the register of the second means for processing is configured to be exclusively writeable in response to execution of the instruction based on a value of a write enable signal received from the first means for processing, wherein the instruction includes an override operand to indicate whether to override contents of the register of the second means for processing, and wherein the first means for storing is external to the second means for processing and accessible to the second means for processing.

34. The apparatus of claim 33, further comprising means for interfacing the first means for processing to the second means for processing, wherein the means for interfacing is compatible with a system memory management unit (SMMU) interface, and wherein the means for interfacing includes the first means for storing.

35. The apparatus of claim 33, wherein the first means for processing is associated with a first instruction set architecture, and wherein the second means for processing is associated with a second instruction set architecture that is different from the first instruction set architecture.

* * * * *